8-6-74 XR 3,827,142

United States Patent [19]

Bennett et al.

[11] 3,827,142

[45] Aug. 6, 1974

[54] TUNING OF ENCAPSULATED PRECISION RESISTOR

[75] Inventors: Kenneth R. Bennett, San Diego; Joseph W. Crownover, La Jolla, both of Calif.

[73] Assignee: GTI Corporation, Pittsburgh, Pa.

[22] Filed: Dec. 11, 1972

[21] Appl. No.: 314,010

[52] U.S. Cl. ........................ 29/620, 29/613, 29/621, 219/121 LM

[51] Int. Cl. .......................... H01c 7/00, H01c 17/00

[58] Field of Search ...................... 29/620, 621, 613; 219/121 L, 121 LM

[56] References Cited

UNITED STATES PATENTS

| | | | |
|---|---|---|---|
| 3,220,097 | 11/1965 | Griest | 338/330 X |
| 3,388,461 | 6/1968 | Lins | 29/620 X |
| 3,458,783 | 7/1969 | Rosenberg | 317/261 X |
| 3,534,472 | 10/1970 | De Jong et al. | 29/620 |
| 3,535,778 | 10/1970 | Falanga et al. | 29/610 |

*Primary Examiner*—Charles W. Lanham
*Assistant Examiner*—V. A. Di Palma
*Attorney, Agent, or Firm*—William W. Haefliger

[57] ABSTRACT

A long wave laser beam is controllably passed through a glassy envelope encapsulating an electrical resistor, to alter its resistance to a precision value.

5 Claims, 5 Drawing Figures

PATENTED AUG 6 1974 3,827,142

TUNING OF ENCAPSULATED PRECISION RESISTOR

BACKGROUND OF THE INVENTION

This invention relates generally to adjustment of fixed resistors to precision values, and more particularly to making such adjustments after resistors have been encapsulated, as by vacuum sealing within glass envelopes.

In the past, chip resistors (metallic films formed on substrates) have been tuned or adjusted to desired values by use of mechanical means such as abrading techniques, as for example blasting of abrasive on the metal. Where resistance elements have been sealed in vacuum tight glass envelopes, abrasion methods cannot be employed without breaking the envelopes, which destroys the resistance element.

SUMMARY OF THE INVENTION

It is a major object of the invention to overcome the above described problems through application of laser techniques whereby a long wave length laser beam is passed through the glass envelope to impinge upon the resistance metal and change its resistance to desired value. As will be seen, the invention is of unusual advantage where encapsulation has been carried out in accordance with blister formation techniques to be described.

These and other objects and advantages of the invention, as well as the details of an illustrative embodiment will be more fully understood from the following description and drawings, in which:

DRAWING DESCRIPTION

DETAILED DESCRIPTION

Figure 1:
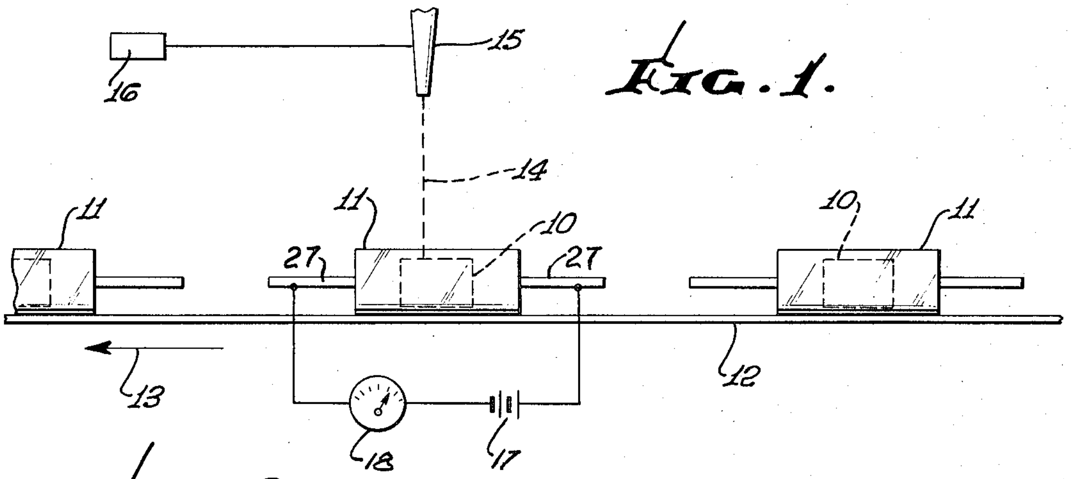
FIG. 1 is an elevation showing laser beam treatment of an encapsulated resistor.

Referring first to FIG. 1, precision resistors 10 are shown as encapsulated within glass envelopes 11 supported as on a belt or other means 12. The latter is slowly movable in the direction of arrow 12. The resistors may typically comprise chips each consisting of a thin film of metal vacuum deposited on a substrate. Merely by way of example, typical metals include nickel and chromium and mixtures or alloys thereof, and typical substrates include ceramic material such as barium titanate, aluminum oxide and glass.

In accordance with the method of the invention, a laser beam 14, emanating from source of generator 15, is directed through the envelope 11 to impinge on the resistance element, i.e., the metal film for example, thereby to effect a change in the electrical resistance of the precision resistor to a desired value. For this purpose, the beam may be caused to impinge on successively different portions of each resistor, as by movement of the support means 12 as described, or by movement of the generator 15, or both. Also, the beam may be controlled, as by control means 16 connected with the generator, to interrupt the beam when the measured resistance of the resistor 11 arrives at the precise desired value, and for that purpose a source of voltage 17 and a precision ohmmeter 18 may be connected in series with the leads 27 projecting form the opposite ends of the envelope. Typically, beam impingement on the relatively moving encapsulated resistance element is continued for a time interval of between 0.5 and 60 seconds, depending on the amount of resistance increase desired, and the intensity of the beam.

The laser beam wave lengths must be sufficiently long to pass harmlessly through the glass envelope for energy absorption by the resistance element to burn away a small portion of the latter. For this purpose, low frequency beams exhibiting wave lengths the order of one thousandth of a millimeter or longer must be used, as where the glass envelopes are transparent to electromagnetic energy of only that wavelength or longer. It is found that the resistance element can be tuned, in this manner, over a relatively wide range, i.e., up to around three times its original resistance value, and to a resolution or tolerance of 0.01 percent of a given resistance value. As an example, a raw, randomly selected, glass encapsulated resistor exhibiting a resistance of 21,850 ohms, may be tuned in this manner to a value of 62,000 ± 6 ohms.

The above procedure enables rapid and inexpensive manufacture of extremely accurate, glass encapsulated resistors, as for example of the type which exhibit only small resistance change as a function of change of temperature. (i.e., around 10 parts per million change in resistance per degree Centigrade temperature change).

While the invention may be applied to trimming of resistors encapsulated in accordance with various processes, it is of unusual advantage when applied to resistors encapsulated in the manner to be described, as referred to in that certain application Ser. No. 263,950 for U.S. Letters Patent entitled, "Ceramic Chip Encapsulation With Terminal Contacting Blister Formation." Such encapsulation techinique will now be described, and it will be understood that the FIG. 1 resistors 10 may be encapsulated in that manner, and with unusual advantage.

Figure 2:
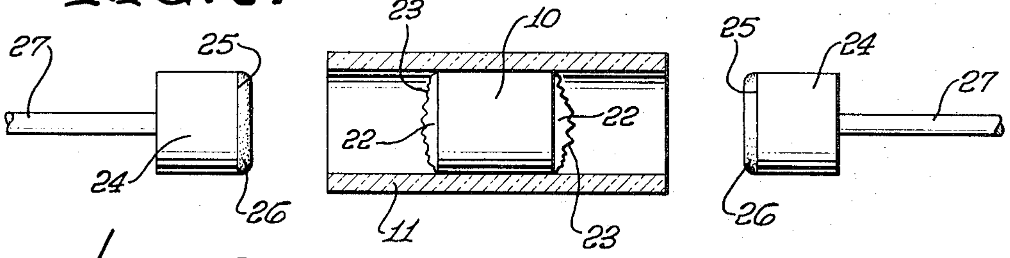
FIGS. 2–4 are elevations taken in section to show different stages in the method of encapsulating a resistor.

Referring to FIG. 2, a chip 10 is shown positioned in a glass sleeve or tube 11, the chip having end terminals 22 with irregular surfaces 23, exaggerated for illustration purposes. The chip may, for example, consist of a ceramic substrate supporting an electrical resistor such as a vacuum deposited metallic film. Electrodes in the form of metal plugs 24 are shown outside the sleeve ends, with noble metal oxide particles applied to the ends 25 of the plugs, the particles for example dispersed in a volatile hydrocarbon carrier to form a paste 26 adhering to the plug ends. As an example, a particulate composed of highly oxidized palladium and silver metal powder may be dispersed in a $PbO$-$B_2O_3$-$SiO_2$ glass grit, and the mixture may be milled to suitable fineness to form a viscous paste or printable ink when combined with a suitable organic vehicle, such as plasticized and thinned ethyl cellulose. For this purpose, about 30 grams of palladium oxide, plus about 10 grams of silver powder may be mixed with about 60 grams of grit. The grit ingredients may be in the approximate proportions 48 grams of $PbO$, 4.8 grams of $B_2O_3$, and 7.2 grams of $SiO_2$. The paste is applied to the flat surfaces 25 of the end plugs so as to exist at, and act as the interface between, the plugs 24 and terminals 22 of the chip 10.

Figure 3:
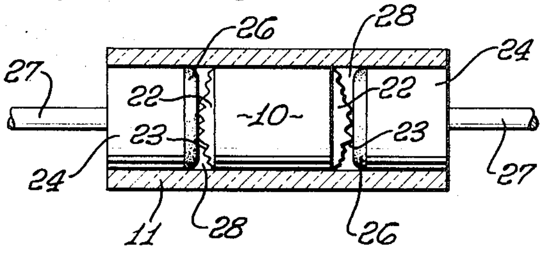

In FIG. 3, the plugs 24 have been inserted into the glass sleeve 11, with the noble metal paste 26 in contact with the outermost tips of the irregular surfaces 23 of the terminals 22, wire leads 27 projecting endwise oppositely from the plugs with which they are integral. Note the relatively large voids 28 between the metal plug and chip elements, and which would preclude the establishment of good thermal contact as required in the case of resistive chips.

Figure 4:
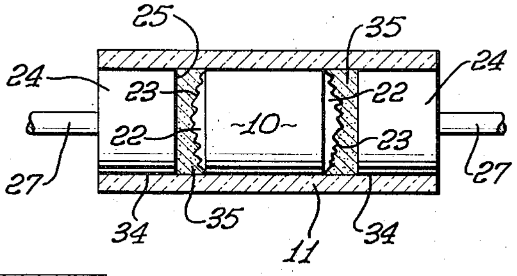
Figure 5:
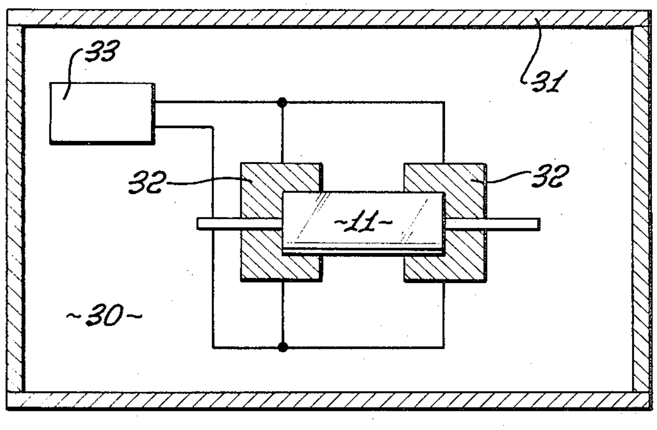
FIG. 5 is a view, in sectional elevation, of heating dequipment for sealing the capsule.

In FIG. 5, the assembly is shown subjected to heating, as within a non-oxidizing atmosphere 30 inside enclosure 31, gases such as nitrogen, argon, helium, hydrogen or combinations of same being employed. Graphite boats or carriers 32 are received over the ends of the sleeve, and electrical current from a source 33 is supplied to the boats to achieve heat sealing temperatures on the order of 700° to 800° C, effecting formation of glass to metal bonds between the sleeve and metal plugs. Such gas-tight bonds are shown at 34 in FIG. 4.

Also seen in FIG. 4 are blisters 35 filling the voids 28 and characterized by active noble metal surfaces in extended and intimate contact or engagement with the irregular surfaces 23 of terminals 22, as well as with the end faces 25 of the metal plugs. These blisters are formed as a result of heat transmission to the paste 26 during the FIG. 5 sealing operation, the noble metal particulate having expanded. The noble metal oxide decomposes, with release of oxygen to generate active noble metal surfaces welding into chain-like metallic aggregates of very low ohmage. Further, the oxygen release after completion of hermetic sealing as described produces a local, entrapped oxydizing atmosphere within the package preventing deterioration of the ceramic capacitor chip, despite the existence of the reducing atmosphere 30 outside the capsule.

Palladium powder when heated begins to oxidize at about 450° C, and proceeds to substantially complete formation of palladium oxide (13 percent weight gain) at about 800° C. If heated beyond 800° C, it rapidly loses oxygen. The presence of metallic silver powder causes decomposition to begin at lower temperatures, i.e., around 700° C. It will be understood that noble metals other than palladium are also useful, an example being ruthenium oxide. Thus, 30 grams of the latter may be combined with 10 grams of silver powder and mixed with 60 grams of grit, as described, to form the paste.

A typical glass, of envelope 11, consists of, generally, a low-alkali, lead glass, one example being Kimble EG–16.

We claim:

1. The method of making an encapsulated precision resistor, that includes a. encapsulating a resistance element within a glassy envelope, the element consisting of a metallic film on a substrate and having terminals within the envelope in the form of a glass sleeve to which electrode plugs are fitted at opposite ends of the element, said encapsulating step including confining noble metal oxide particles between the plugs and the element terminals and in a reducing gas environment, transferring heat to the particles from the exterior of the sleeve and plugs to cause blister formation characterized by particle decomposition with oxygen release and formation of active noble metal surfaces urged into intimate contact with the element terminals, and fusing the sleeve to the plugs to hermetically seal the element in the sleeve, and b. directing a laser beam through the envelope to impinge on said element and thereby effect a change in the electrical resistance of said element to a desired value.

2. The method of claim 1 wherein said laser beam exhibits a wave length of at least about one thousandth of a millimeter.

3. The method of claim 1 wherein said change increases the resistance of said element.

4. The method of claim 1 including effecting relative movement of the beam and element to effect beam impingement on different portions of the element.

5. The method of claim 1 wherein the impingement of the beam on the element is continued for a time interval between 0.5 and 60 seconds.

* * * * *